United States Patent [19]

Nikota

[11] 4,100,658
[45] Jul. 18, 1978

[54] FISHING LURE-AND-LINE SNAP SWIVEL

[76] Inventor: John P. Nikota, 876 Riverdale, Windsor, Canada N8S 4C1

[21] Appl. No.: 774,600

[22] Filed: Mar. 23, 1977

Related U.S. Application Data

[63] Continuation-in-part of Ser. No. 708,308, Jul. 26, 1976, abandoned.

[51] Int. Cl.² .................................. A44B 13/02
[52] U.S. Cl. ........................... 24/231; 24/237; 59/95; 24/241 S; 43/44.83; 403/164
[58] Field of Search ........ 24/237, 230.5 W, 230.5 SS, 24/241 S, 241 PL; 59/95; 403/164, 165; 43/44.83, 43.16

[56] References Cited

U.S. PATENT DOCUMENTS

| | | | |
|---|---|---|---|
| 554,992 | 2/1896 | Donnellan | 59/95 |
| 612,576 | 10/1898 | Smallwood | 59/95 |
| 799,491 | 9/1905 | Palmer | 59/95 |
| 860,090 | 7/1907 | Heidt | 24/237 |
| 1,313,372 | 8/1919 | Dodge | 24/237 |
| 2,240,235 | 4/1941 | Whan | 24/237 |
| 2,486,635 | 11/1949 | Coats | 24/237 |
| 3,241,201 | 3/1966 | Chester | 403/164 |
| 3,750,240 | 8/1973 | Fridrich | 24/237 |

Primary Examiner—Bernard A. Gelak
Attorney, Agent, or Firm—Willis Bugbee

[57] ABSTRACT

The shank of an eye fastener forming a fishing line connector is relatively rotatably mounted in one or more circular bearing loops of the bearing portion of a bent wire structure forming a fishing lure connector. From one end of the bearing portion extends an approximately U-shaped or V-shaped lure connection portion which terminates in a keeper bend. From the other end of the bearing portion a closure portion extends across the open end of the U-shaped or V-shaped portion and terminates in a latch bend which releasably interlocks with the keeper bend.

10 Claims, 9 Drawing Figures

FISHING LURE-AND-LINE SNAP SWIVEL

This is a continuation-in-part of my co-pending application Ser. No. 708,308 filed July 26, 1976, now abandoned, for Fishing Lure-and-Line Swivel Coupling.

SUMMARY OF THE INVENTION

The invention primarily resides in the bent wire structure of the fishing lure connector having a closure portion connected to the U-shaped or V-shaped lure portion and in the circularly-bent bearing loop portion through which the fishing line connector eye shank relatively rotatably passes, said bearing loop portion being retained on said shank by an abutment fixedly mounted on said shank in spaced relationship with said eye.

In the drawing:

FIG. 7 is a side elevation of a still further modified fishing lure-and-line snap swivel with a single-loop swivel bearing portion;

Figure 1:
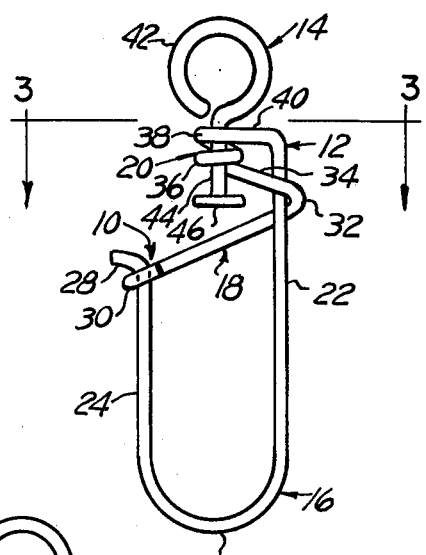
FIG. 1 is a side elevation of a fishing lure-and-line snap swivel, in its closed position.

Referring to the drawing in detail, FIG. 1 shows a fishing lure-and-line snap swivel, generally designated 10, according to one form of the invention, for releasably and pivotally interconnecting two fishing tackle articles, such as, for example, a fishing lure with a fishing line (not shown). The snap swivel 10 consists of a bent wire lure snap connection, generally designated 12, and a rotary swivel line connector or eye fastener, generally designated 14, pivotally connected thereto for rotation relatively thereto. The fishing lure connector 12 consists of a bent wire structure formed from a single piece of wire and includes an approximately U-shaped lure attachment portion 16 at one end, a closure portion 18 at its opposite end and a double bearing loop portion 20 intermediate its portions 16 and 18. The U-shaped lure attachment portion 16 consists of inner and outer arms 22 and 24 joined by an arcuate portion 26. The outer arm 24 terminates in a keeper bend 28 which cooperates with a latch bend 30 on the end of the closure portion 18.

At its opposite end the closure portion 18 terminates in a reverse bend 32 which joins an arm portion 34. The latter in turn joins the lower loop 36 of the double bearing loop portion 20 which continues in an upper loop 38. The latter is joined to the upper end of the inner arm 22 of the U-shaped lure attachment portion 16 by an arm portion 40, thereby completing the construction of the bent wire structure which forms the fishing lure connector 12. The rotary fishing line connector 14 also consists of a single piece of wire bent at one end into a circular fishing line attachment eye 42 which in turn is connected to a straight shank 44 which passes pivotally and rotatably through the bearing loop 20 to an enlargement 46 fixedly mounted on its end opposite the line attachment eye 42 and in spaced relationship therewith.

Figure 2:
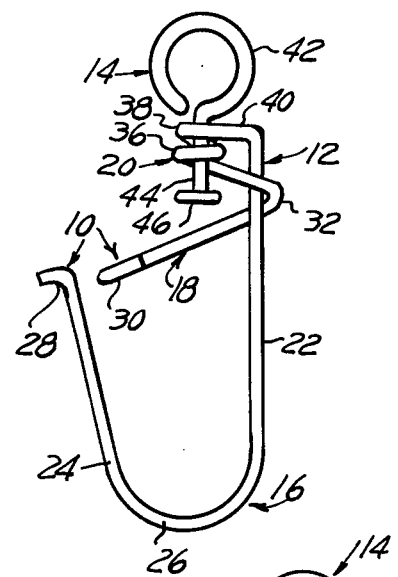
FIG. 2 is a view similar to FIG. 1 but with the snap swivel in its open position.
Figure 3:
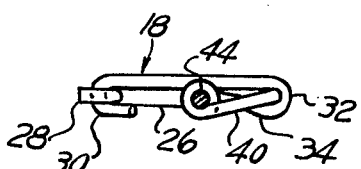
FIG. 3 is a horizontal section taken along the line 3—3 in FIG. 1.
Figure 4:
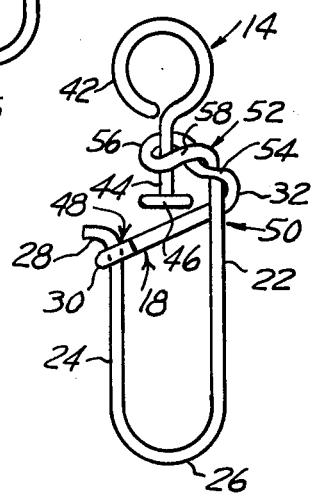
FIG. 4 is a side elevation of a modified fishing lure-and-line snap swivel of FIGS. 1, 2 and 3 in its closed position.
Figure 5:
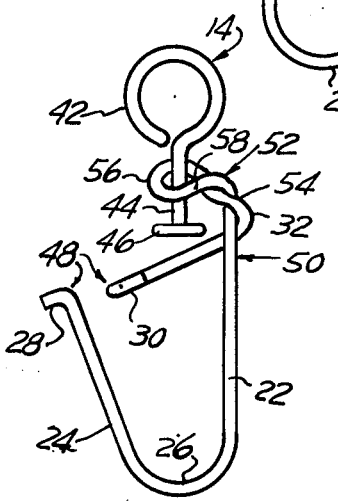
FIG. 5 is a view similar to FIG. 4 showing the modified snap swivel in its open position.

The modified fishing lure-and-line snap swivel, generally designated 48, shown in FIGS. 4 and 5, is of substantially the same construction as the fishing lure-and-line snap swivel 10 of FIGS. 1, 2 and 3 with the exception of the altered construction of the swivel loop portion 52 of the bent wire lure connector 50 which differs somewhat from the bearing loop portion 20 of FIG. 1. The remainder of the snap swivel 48 is substantially the same as that of the coupling 10, hence corresponding portions are designated with the same reference numerals. As before, the inner end of the closure portion 18 terminates in a reverse bend 32 but the opposite arm 54 is much shorter than the arm 34, is undulatory in form, and terminates in a single swivel bearing loop 56. The portion 58 is curved upward toward its junction with the upper end of the inner arm 22 of the attachment portion 12. The rotary swivel line connector 14 remains essentially unchanged from the similarly numbered element in FIGS. 1 and 2, but its shank 44 passes pivotally and rotatably through only the single swivel bearing loop 56 in contrast to the double loop portion 20 of FIGS. 1 and 2.

Figure 6:
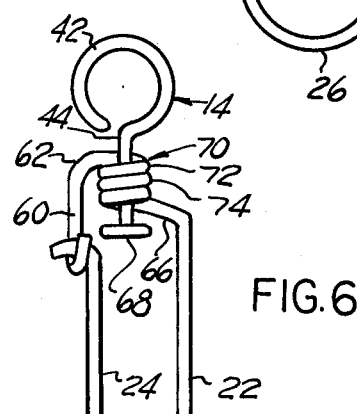
FIG. 6 is a side elevation of a further modified fishing lure-and-line snap swivel with a triple loop swivel bearing portion.

The further modified lure-and-line snap swivel, generally designated 60, shown in FIG. 6, is generally similar to that shown in FIGS. 1 and 2, except that the closure portion 62 and the swivel bearing portion 64 are differently arranged, and that the swivel bearing portion 64 has three bearing loops instead of two. The other parts of the further modified lure-and-line snap swivel are substantially unchanged, hence are designated with the same reference numerals with which they are designated in FIGS. 1 and 2. In FIG. 6, however, the arm 66 extends to the lowermost loop 68 of the triple bearing loop portion 70 and passes behind the shank 44 of the rotary swivel line connector 14, whereas the closure portion 62 extends downward from the uppermost loop 72, with an additional loop 74 disposed between the upper and lower bearing loops 72 and 68. In both instances, the arm 66 and closure portion 62 join their respective loops behind the shank 44 instead of in front of it, as in FIGS. 1 and 2. This construction considerably simplifies the arrangement as well as also simplifying the manufacture. The operation of the further modified lure-and-line snap swivel 60 is substantially the same as that of the lure-and-line snap swivel 10 of FIG. 1, hence is believed to require no further explanation.

The still further modified fishing lure-and-line snap swivel, generally designated 80, is also generally similar to that shown in FIGS. 4 and 5, except that the closure portion 82 passes in front of the inner arm 22 at its reverse bend 84 instead of behind it as in FIG. 4, whereas the inner arm 22 is joined by an arm portion 86 to the single bearing loop 88 by passing behind the shank 44 of the rotary swivel line connector 14 which continues in an arm portion 90 directly to the reverse bend 84. This construction, likewise, simplifies the construction and manufacture of the lure-and-line snap swivel 80, as compared with the construction shown in FIGS. 4 and 5 which also employs a single bearing loop. Here again, the operation of the lure-and-line snap swivel 80 of FIG. 7 is similar to that of the coupling 48 of FIGS. 4 and 5, hence no further description thereof is believed to be necessary.

Figure 8:
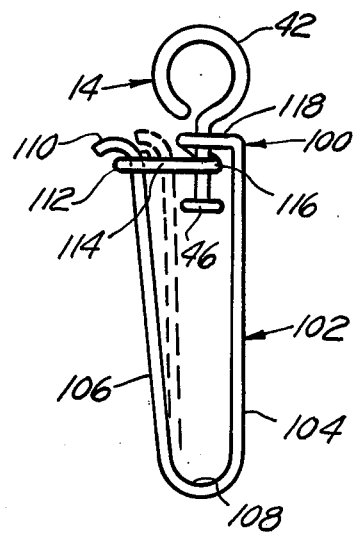
FIG. 8 is a side elevation of an additionally modified fishing lure-and-line snap swivel with a single-loop swivel bearing portion.

The additionally modified fishing lure-and-line snap swivel, generally designated 100, shown in FIG. 8 is also generally similar to that shown in FIGS. 1 and 2, especially as regards the swivel line connector, hence the latter is designated with the same reference numerals 14 and 42 to 46 inclusive. The bent wire lure snap connector 102, however, is generally V-shaped with inner and outer arms 104 and 106 respectively diverging from and integral with an arcuate portion 108. The outer arm 106 terminates in an approximately semi-circular keeper bend 110 which cooperates with an approximately semi-circular latch bend 112 on the outer end of the closure arm 114 which extends outward approximately perpendicular to the straight shank 44 of the lure attachment swivel line connector 14. The closure arm 114 at its inner end terminates in the integral single swivel bearing loop 116 which encircles the shank 44 and then continues in a parallel arm 118 and emerges on the same side of the shank 44 as the arm 114. The arm 118 emerges adjacent the eye 42 and is integral with the upper end of the inner arm 104.

The snap swivel, generally designated 100, when in operation has the advantage that the pull by the lure on the arcuate portion 108 is more nearly in line with the inner arm 104 than would be the case with the U-shaped lure attachment portion 16 or 50 joining the arms 22 and 24 of the snap swivels of FIGS. 1 to 7 inclusive. It also has the further advantage that the arcuate portions 110 and 112 on the ends of the arms 106 and 114 cannot become detached from one another in response to such a pull or by the action of a fish.

Figure 9:
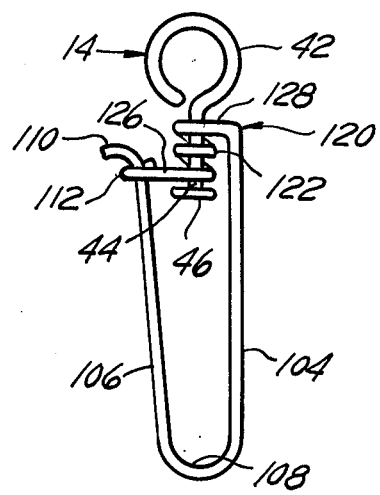
FIG. 9 is a side elevation of a still further modified fishing lure-and-line snap swivel with a multiple-loop swivel bearing portion.

The construction of the snap swivel, generally designated 120, shown in FIG. 9 is identical with that of FIG. 8 except for the substitution of a multiple-loop swivel bearing portion 122 for the swivel line connector or eye fastener 14, in that the wire for the lure snap connector 124 encircles the shank 44 of the swivel line connector or eye fastener 14 in several turns yet the arms 126 and 128 still emerge parallel to one another on the same side of the shank 44 as do the arms 114 and 118 of the snap swivel 100. Thus the several turns of the bearing portion 122 provide a greater length of bearing for the shank 44 than the single turn bearing loop 116.

Both the snap swivels 100 and 120 of FIGS. 8 and 9 respectively have the advantage of greater simplicity than in the forms of the invention shown in FIGS. 1 to 7 inclusive and consequently can be made at a lower cost of manufacture.

I claim:

1. A fishing lure-and-line snap swivel, comprising a fishing line connector having thereon a shank with a line attachment portion and a retaining abutment fixedly mounted on said shank and disposed in spaced relationship to said line attachment portion, and a one-piece bent wire fishing lure connector including a bearing loop portion disposed on said shank between said line attachment portion and said retaining abutment and relatively rotatably receiving said shank and also including a reversely-bent lure attachment portion extending from one end of said bearing loop portion and a closure portion extending from the other end of said bearing loop portion across the open end of said lure attachment portion, said lure attachment portion and said closure portion having releasable latch and keeper portions respectively disposed upon the outer ends thereof in proximity to one another and to said bearing loop portion and movable into and out of interlocking engagement with one another.

2. A snap swivel, according to claim 1, wherein said bearing loop portion comprises a plurality of bearing loops extending around said shank.

3. A snap swivel, according to claim 1, wherein said bearing loop portion comprises a single loop extending around said shank.

4. A snap swivel, according to claim 1, wherein said lure attachment portion has interconnected inner and outer arms, and wherein said closure portion extends reversely around said inner arms to a place of junction with said bearing loop portion.

5. A snap swivel, according to claim 4, wherein said place of junction is disposed at the inner end of said bearing loop portion.

6. A snap swivel, according to claim 4, wherein said place of junction is disposed at the outer end of said bearing loop portion.

7. A snap swivel, according to claim 1, wherein said one end of said bearing loop portion is the end thereof nearest said lure attachment portion, and wherein said other end of said bearing loop portion is the end thereof nearest said fixedly mounted retaining abutment.

8. A snap swivel, according to claim 7, wherein said lure attachment portion has interconnected inner and outer arms and also has an intermediate arm extending between the end of said inner arm remote from the connection of said inner arm with said outer arm to said other end of said bearing loop portion.

9. A snap swivel, according to claim 8, wherein said closure portion and said intermediate arm are disposed substantially parallel to one another.

10. A snap swivel, according to claim 1, wherein said lure attachment portion has interconnected inner and outer arms disposed at an acute angle to one another with said inner arm substantially parallel to said shank of said line attachment portion.

* * * * *